United States Patent [19]
Tanaka

[11] Patent Number: 6,011,608
[45] Date of Patent: Jan. 4, 2000

[54] LIQUID CRYSTAL DISPLAY PANEL WHEREIN INORGANIC FILM IS FORMED OVER AN INORGANIC INSULATING FILM OVERLYING WIRINGS EXTENDING ACROSS SEAL AREA

[75] Inventor: Hirohisa Tanaka, Fukaya, Japan

[73] Assignee: Kabushiki Kaisha Toshiba, Kawasaki, Japan

[21] Appl. No.: 09/049,049

[22] Filed: Mar. 27, 1998

[30] Foreign Application Priority Data

Mar. 27, 1997 [JP] Japan .................................... 9-075350

[51] Int. Cl.⁷ ...................... G02F 1/1339; G02F 1/1333; G02F 1/1345
[52] U.S. Cl. .......................... 349/153; 349/122; 349/138; 349/190; 349/149
[58] Field of Search .................................. 349/122, 138, 349/149, 152, 153, 190

[56] References Cited

U.S. PATENT DOCUMENTS

| | | | |
|---|---|---|---|
| 5,513,028 | 4/1996 | Sono et al. | 359/87 |
| 5,717,476 | 2/1998 | Kanezawa | 349/149 |
| 5,721,601 | 2/1998 | Yamaji et al. | 349/138 |
| 5,883,682 | 3/1999 | Kim et al. | 349/122 |
| 5,926,235 | 7/1999 | Han et al. | 349/138 |
| 5,933,209 | 8/1999 | Yonemoto | 349/153 |

FOREIGN PATENT DOCUMENTS

| | | |
|---|---|---|
| 59-151137 | 8/1984 | Japan . |
| 6-138488 | 5/1994 | Japan . |
| 6-258660 | 9/1994 | Japan . |

*Primary Examiner*—William L. Sikes
*Assistant Examiner*—Tarifur R. Chowdhury
*Attorney, Agent, or Firm*—Pillsbury Madison & Sutro LLP

[57] ABSTRACT

The object of the present invention is to prevent disconnection of leading wirings extending across a seal area in a liquid crystal display panel based on a pixel-on-top structure. Scanning lines, signal lines and TFTs are formed over an insulating substrate. Pixel electrodes are formed over these components with an inorganic insulating film and an organic insulating film interposed therebetween. Around the display area in which the pixel electrodes are arranged are placed driver circuits that apply voltage signals to the scanning lines and the signal lines. A sealant is placed in boundary area (seal area) between the display area and the driver circuit area. At the same time the pixel electrodes are formed, ITO film is formed on the inorganic insulating film to overlies leading wirings that extend across the seal area.

10 Claims, 6 Drawing Sheets

LIQUID CRYSTAL DISPLAY PANEL WHEREIN INORGANIC FILM IS FORMED OVER AN INORGANIC INSULATING FILM OVERLYING WIRINGS EXTENDING ACROSS SEAL AREA

BACKGROUND OF THE INVENTION

The present invention relates to a structure of a sealing section which glues a counter substrate to an array substrate with a sealant so that they face each other and more specifically to a sealing structure adapted for a pixel-on-top type of active matrix liquid crystal display panel.

In recent years, the demand has increased for developing liquid crystal display panels with higher angular aperture. To meet high aperture requirements, an approach of arranging pixel electrodes on the top layer of an array substrate is adopted.

With such a pixel-on-top structure, the following problems are involved in the process of etching an ITO film to form pixel electrodes. That is, in order to form an ITO film on the top layer on the array substrate side, it is required to ensure the thickness of a second interlayer insulating film between the ITO film and underlying signal lines. To this end, the second interlayer insulating film uses a multilayered structure and its top layer is made of an organic material. Therefore, the etching of the ITO film is limited to wet etching. The reason is that dry etching fails to ensure sufficient selectivity to the organic insulating film in the etching process and the resist stripping process.

In general, for wet etching of the ITO film, use is made of a strong acid etching solution in which aqua regia, oxalic acid, HBr, Hl, or the like is diluted with water with or without the addition of iron chloride or copper chloride. These etching solutions have the property of etching Al which is generally used as a material of signal lines.

Figure 8:
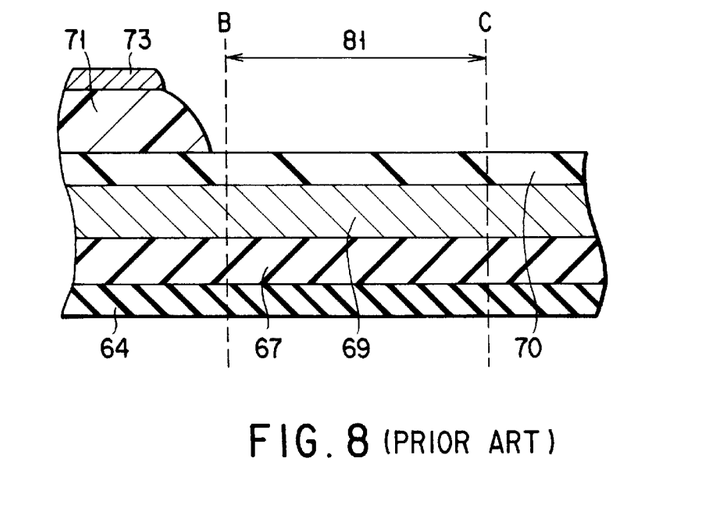
FIG. 8 is a fragmentary cross-sectional view of a boundary area between the display and the driver circuit area of an array substrate in a conventional liquid crystal display panel.

In FIG. 8, there is illustrated a fragmentary cross-section of a boundary area between the display area and the driver circuit area of an array substrate. In this figure, 64 denotes a gate oxide film, 67 a first interlayer insulating film, 69 the leading portion of a signal line, 70 an insulating film made of an inorganic material (the lower layer of a second interlayer insulating film), 71 an insulating film made of an organic material (the upper layer of the second interlayer insulating film), and 73 a pixel electrode made of ITO. The display area is to the left side of broken line B, while the driver circuit area is to the right of broken line C. The boundary between broken lines B and C serves as a seal area 81.

On the seal area 81 is placed a sealant that glues a counter substrate to the array substrate so that they face each other. To ensure good adhesion between the counter substrate and the array substrate, the organic insulating film 71 is removed from the seal area 81. Thus, as the interlayer insulating film only the inorganic insulating film 70 is left on the signal line leading wiring 69. As a result, in the presence of a defect, such as a pinhole, in the insulating film 70, Al forming the signal lines may corrode and lead to disconnection. Thus, the seal area 81 is a region where disconnection is easy to occur.

An object of the present invention is to provide a structure in which disconnection is difficult to occur in the leading portions of wirings that extend across the seal area in an active-matrix liquid crystal display panel using a pixel-on-top structure and having driver circuits integrally incorporated in.

The other object of the present invention is to provide a structure of seal area which permits the position of sealant to be stabilized.

BRIEF SUMMARY OF THE INVENTION

According to the present invention, there is provided a liquid crystal display panel comprising: a substrate on which wirings and switching elements are arranged; an inorganic insulating film formed over the substrate; an organic insulating film formed over the inorganic insulating film; pixel electrodes arranged in a matrix form on the organic insulating film and supplied with signal voltages via the switching elements; a counter substrate placed to face the substrate with a gap therebetween and glued to the substrate with a sealant; and a liquid crystal sealed in the gap, and wherein the substrate has a display area in which the pixel electrodes are arranged, a seal area which surrounds the periphery of the display area and in which the sealant is placed, and a peripheral area around the seal area; and, in the seal area, the organic insulating film is etched away, and an inorganic film is formed over the inorganic insulating film so that it overlies leading portions of the wirings that extend across the seal area.

According to the liquid crystal display panel, the inorganic film serves as a mask that protects the leading portions of the wirings (hereinafter referred to as the leading wirings) from an etching solution during the process of patterning the pixel electrodes. Therefore, the corrosion of the leading wirings due to defects in the inorganic insulating film can be prevented in patterning the pixel electrodes.

It is preferable that the inorganic film be made of the same material as the pixel electrodes and formed simultaneously with the electrodes. In this case, the inorganic film and the overlying photoresist film serve as a mask that protects the leading wirings from the etching solution used in patterning the pixel electrodes. Thus, the corrosion of the leading wirings due to defects in the inorganic film can be effectively prevented without an increase in steps.

It is preferable that the inorganic film be formed into electrically isolated segments each of which overlies a respective one of the leading wirings. This will prevent malfunction of the array substrate even if the inorganic film were shorted to the leading wirings because of the presence of defects, such as pinholes, in the inorganic insulating film. Thus, a yield improvement is achieved, It is preferable that the inorganic insulating film be formed in the peripheral area as well (that is, the organic film is etched away from the seal area but left in the peripheral area) and the sealant be in contact with the end surface of at least one of the organic insulating film formed over the display area and the organic insulating film formed over the peripheral area. This permits the sealant to be locked by the end surface of the inorganic insulating film when the counter substrate is glued to the array substrate so that they face each other, stabilizing the sealant position. This structure is also effective for the case where the inorganic film is not formed.

It is preferable that each of those end surfaces of the organic insulating film formed over the display area and the organic insulating film formed over the peripheral area which abut against the seal area be formed to make an obtuse angle with respect to the surface of the array substrate. This ensures good contact between the sealant and the organic insulating film.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

EXAMPLE 1

An embodiment of a liquid crystal display panel of the present invention will be described with reference to FIGS. 1, 2 and 3. In this embodiment, the liquid crystal display panel is an active-matrix liquid crystal display panel which has driver circuits integrally incorporated in. On portions of an array substrate around the display area are placed Y-direction driver circuits that apply scan signals to scan lines and X-direction driver circuits that apply image signals to signal lines. Polysilicon TFTs are used as switching elements. The TFT manufacturing process is irrelevant to the present invention. As with the previous description of the prior art technique, therefore, the description of the present invention starts from the state where TFTs and signal lines have been already formed.

Figure 1:
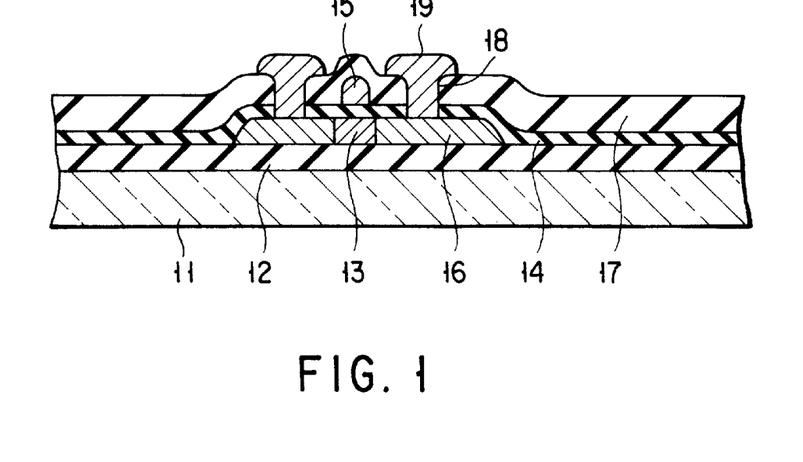
FIG. 1 is a fragmentary cross-sectional view of an array substrate at the termination of the process of forming signal lines in a liquid crystal display panel of the present invention.

Referring now to FIG. 1 there is illustrated in a cross-sectional view the array substrate at the stage in which signal lines 19 have been formed. As shown, a glass substrate 11 is formed on top with an undercoating film 12 of a two-layer structure of a oxide film and a silicon nitride film. On the undercoating film 12 is formed a coplanar polysilicon TFT composed of a semiconductor active layer 13 (channel), highly doped regions 16 serving as source and drain, a gate oxide film 14, and a gate electrode 15. Th e scanning lines are formed in the same process as the gate electrode 15. On the scanning lines and the gate electrode 15 is formed a first interlayer insulating film 17 consisting of an oxide film, on which signal lines 19 made of two layers of Mo and Al are formed. Each of the signal lines 19 is connected with a corresponding one of the highly doped regions 16 through a first contact hole 18 formed in the first interlayer insulating film 17 and the gate oxide film 14.

Figure 2:
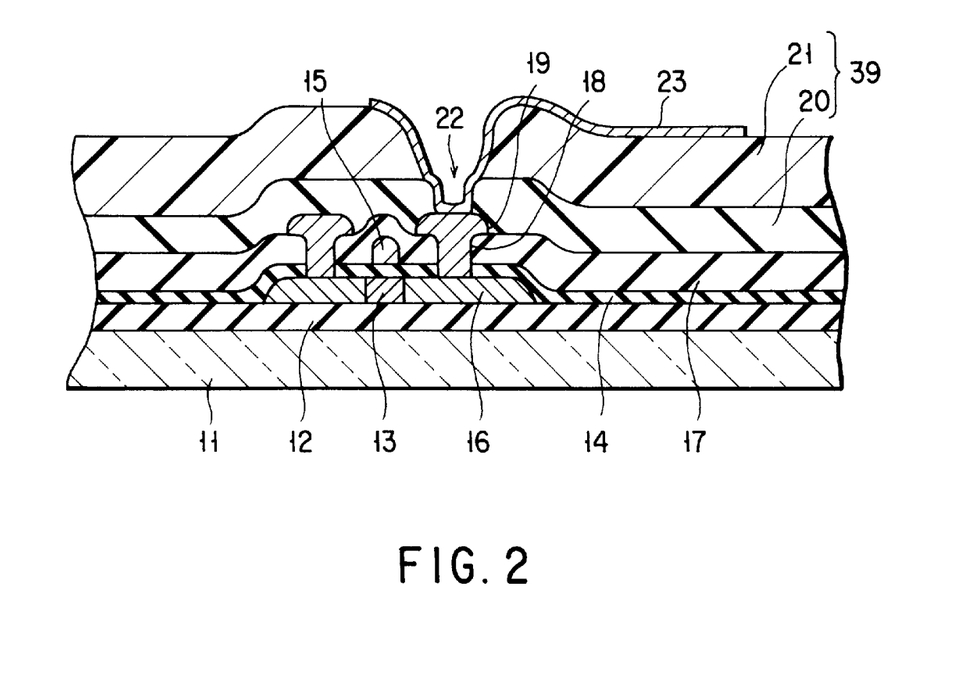
FIG. 2 is a fragmentary cross-sectional view of the array substrate at the termination of the process of forming pixel electrodes in the liquid crystal display panel of the present invention.

Next, as shown in FIG. 2, an inorganic insulating film 20 is deposited over the signal lines 19 at a thickness of 0.45 μm by means of plasma CVD techniques. Using reactive ion etching techniques, the inorganic insulating film 20 is etched to form a second contact hole 22 until the signal line is exposed. After coating of an organic material having photosensitivity, exposure, development and etching are performed to form an organic insulating film 21. The second contact hole 22 is formed again in the organic insulating film 21. In this example, the thickness of the organic insulating film 21 is selected to be 2.0 μm. Thus, a second interlayer insulating film 39 is made from the inorganic insulating film 20 and overlying organic insulating film 21.

Further, ITO (Indium Tin Oxide) is deposited over the second interlayer insulating film 39 by means of sputtering techniques. A photoresist is deposited over the insulating film 39 to a thickness of 1.2 μm and wet etching is performed after exposure and development to thereby form pixel electrodes 23.

Figure 3A:
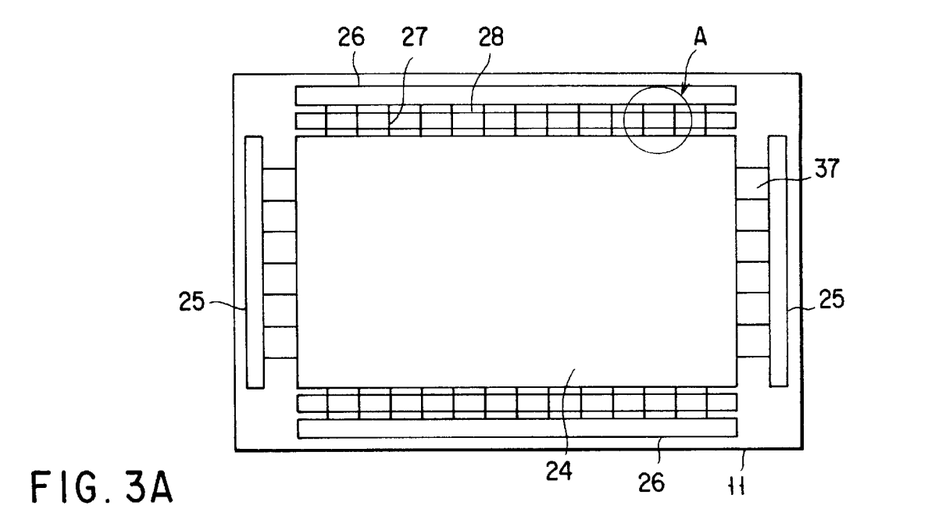
FIG. 3A is a top view of the array substrate at the termination of the process of forming pixel electrodes in a first example of a liquid crystal display panel of the present invention.

FIG. 3A is a schematic illustration of the array substrate viewed from above at the termination of the process for forming the pixel electrodes 23. A display area 24 is located in the center of the array substrate. Y-direction drivers 25 are placed in the peripheral portions of the array substrate to the right and left of the display area 24, while X-direction driver circuits 25 are placed in the peripheral portions of the array substrate above and below the display area. Leading portions 27 of the signal lines connect the inside of the display area 24 and the X-direction driver circuits 26 together. Leading portions 37 of the scanning lines connect the inside of the display area 24 and the Y-direction driver circuits 25 together.

Since both-side driving is used in view of redundancy, the paired X-direction driver circuits 26 are provided on the upper and lower sides and the paired Y-direction driver circuits 25 are provided on the right and left sides. Being formed in the same process as the signal lines to avoid an increase in the number of steps, the leading portions 27 of the signal lines are made of two layers of Mo and Al.

In the liquid crystal display panel of the present invention, as shown in FIG. 3A, in patterning the ITO film to form the pixel electrodes 23, the ITO film 28 located over the boundary area (sealing area) between the display area and the X-direction driver circuits 28 is left.

Figure 3B:
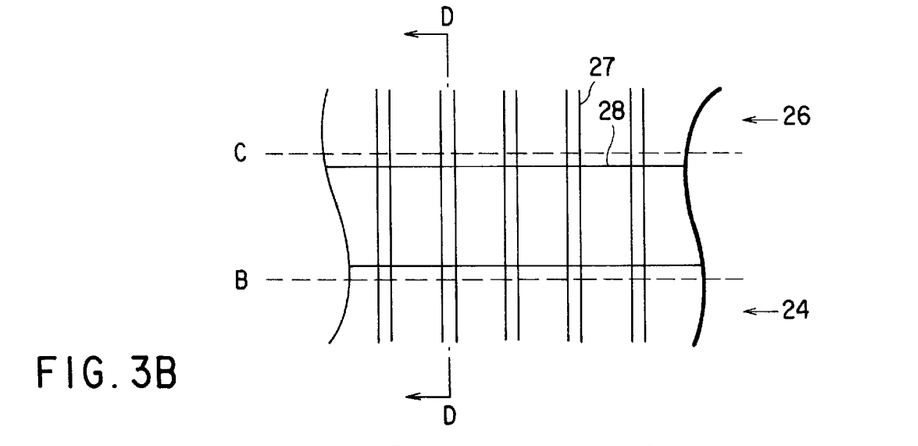
FIG. 3B is an enlarged sectional view of a portion indicated at A in FIG. 3A.

In FIG. 3B, there is illustrated in an enlarged view a portion indicated at A in FIG. 3A, i.e., a portion of the boundary area between the display area 24 and the X-direction driver circuit 26 of the array substrate. FIG. 3C is a cross-sectional view taken along line D—D of FIG. 3B. In these figures, reference numeral 27 denotes the leading portions of the signal lines, 28 the ITO film, 14 the gate oxide film, 17 the first interlayer insulating film, 20 the insulating film made of an inorganic material (the lower layer of the second interlayer insulating film), 21 the insulating film made of an organic material (the lower layer of the second interlayer insulating film), and 23 the ITO film forming the pixel electrodes.

In FIG. 3B, the display area 24 is located on the lower side of broken line B, and the X-direction driver circuit area is located on the upper side of broken line C. The boundary area is located between the two broken lines. In FIG. 3C, the display area is to the left of broken line B, and the X-direction driver circuit area is to the right of broken line C. The display area is sandwiched between the two broken lines.

Figure 3C:
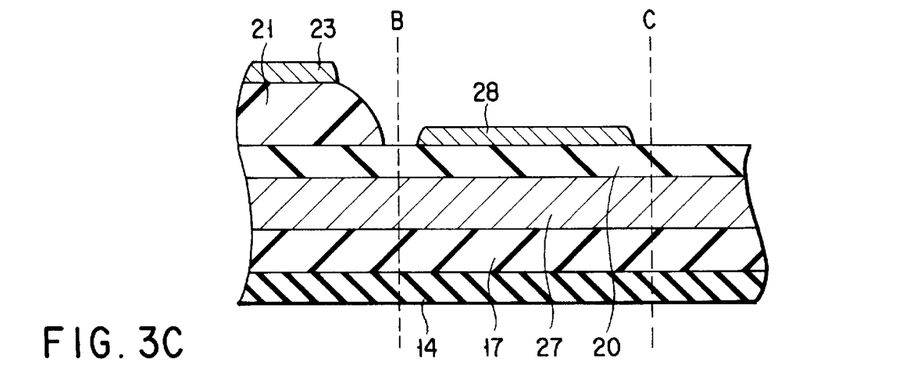
FIG. 3C is a sectional view taken along line D—D of FIG. 3B.

As shown in FIG. 3C, the organic insulating film 21 is etched away from the boundary area. As described previously, this is because a sealant is placed on the boundary area in a subsequent step. The ITO film 28, formed in the same process as the pixel electrodes, is located above the signal line leading portions 27 with the inorganic insulating film 20 interposed therebetween.

The formation of the ITO film 28 prevents the signal line leading portions from being corroded by an etching solution for ITO during the process of patterning the pixel electrodes 23. That is to say, a photoresist (not shown) formed over the ITO film 28 provides a function of protecting the signal line leading portions 27 as well as the inorganic insulating film 20 from the etching solution for ITO during the photolithographic process for the pixel electrodes 23.

EXAMPLE 2

Figure 4A:
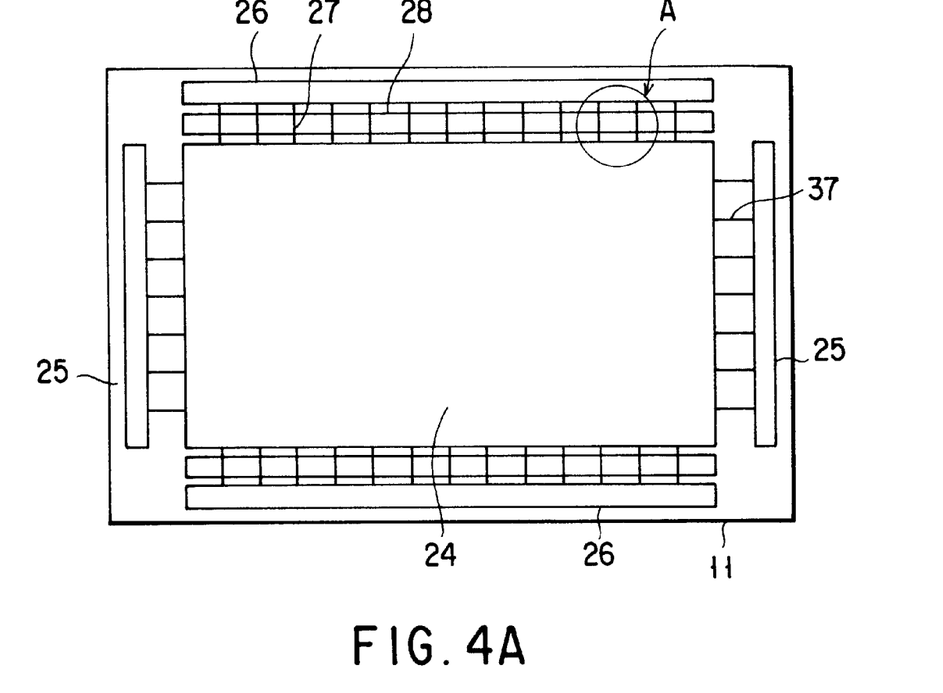
FIG. 4A is a top view of an array substrate at the termination of the process of forming pixel electrodes in a second example of a liquid crystal display panel of the present invention.
Figure 4B:
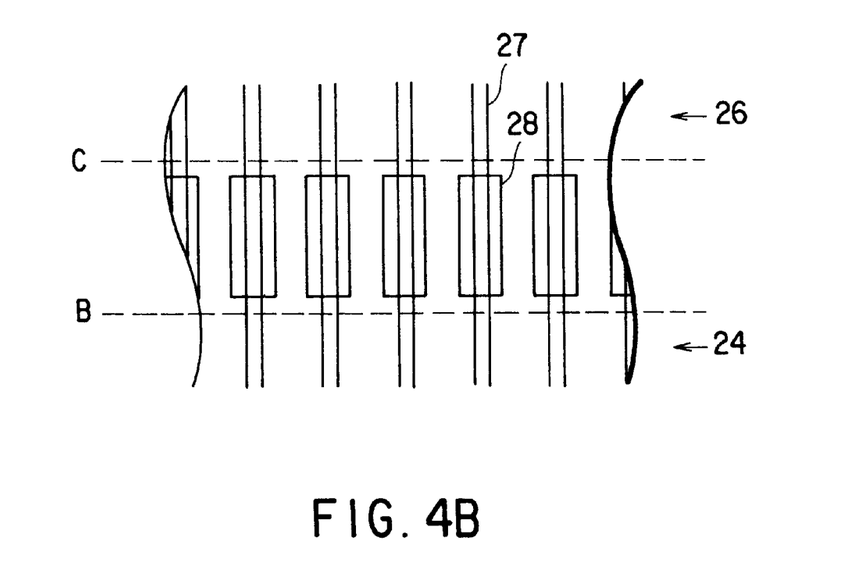
FIG. 4B is an enlarged sectional view of a portion indicated at A in FIG. 4A.

Another embodiment of the present invention is illustrated in FIGS. 4A and 4B. FIG. 4A is a schematic representation of the array substrate viewed from above after termination of the process of forming the pixel electrodes 23. FIG. 4B is an enlarged view of a portion indicated at A in FIG. 4A.

In this example, the ITO film 28, formed above the signal line leading portions 27 by the same process as the pixel electrode, is formed into electrically isolated segments each of which overlies a respective one of the signal line leading portions. By forming the ITO film in this manner, the array substrate will cause no malfunction even in the presence of defects, such as pinholes, in the inorganic insulating film 20 (see FIG. 3C) which may short the ITO film to the signal line leading portions. Thus, such a structure produces a yield improvement.

EXAMPLE 3

Figure 5A:
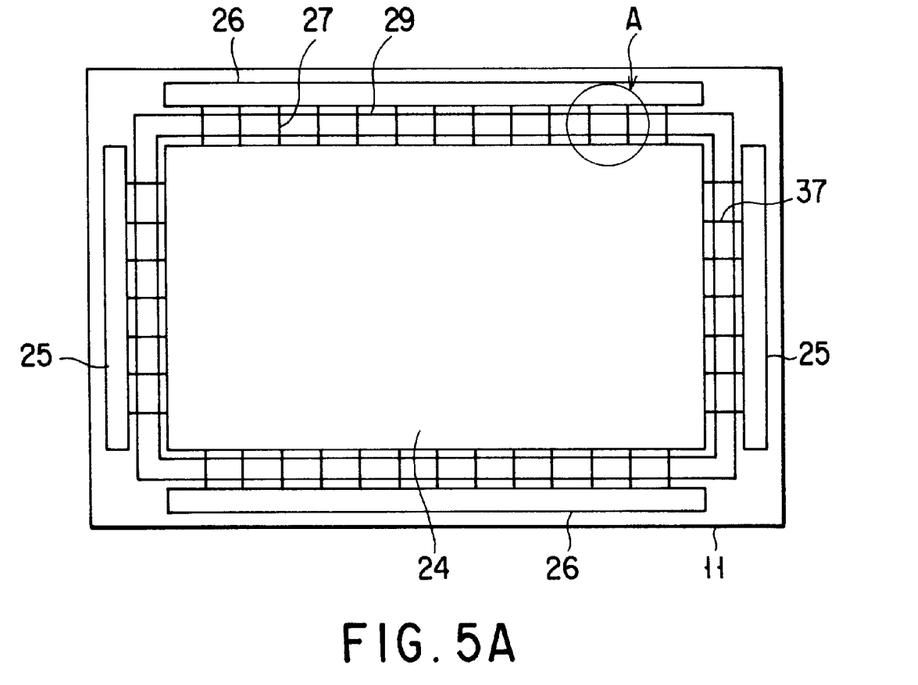
FIG. 5A is a top view of an array substrate at the termination of the process of forming pixel electrodes in a third example of a liquid crystal display panel of the present invention.
Figure 5B:
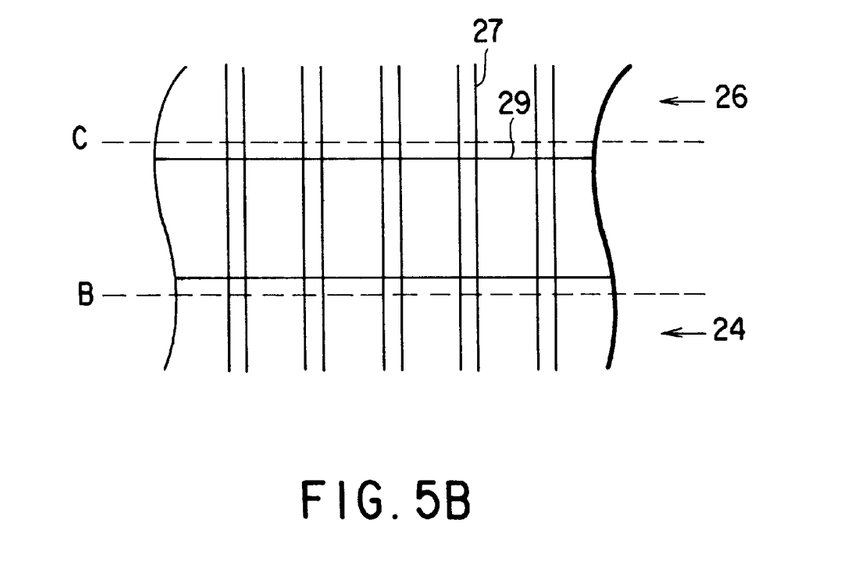
FIG. 5B is an enlarged sectional view of a portion indicated at A in FIG. 5A.

Still another embodiment of the present invention is illustrated in FIGS. 5A and 5B. FIG. 5A is a schematic representation of the array substrate viewed from above after termination of the process of forming the pixel electrodes 23. FIG. 5B is an enlarged view of a portion indicated at A in FIG. 5A.

In this example, an ITO film 29 is formed over the boundary areas between the display area 24 and the X-direction driver circuit areas 26 and the boundary areas between the display area and the Y-direction driver circuit areas 25 so that it continuously surrounds the periphery of the display area 24. By being formed to surround the periphery of the display area 24, the ITO film 29 protects the leading portions 27 of the signal lines and at the same time serves as a guard ring to prevent the inside of the array substrate from being charged with static electricity.

EXAMPLE 4

Figure 6A:
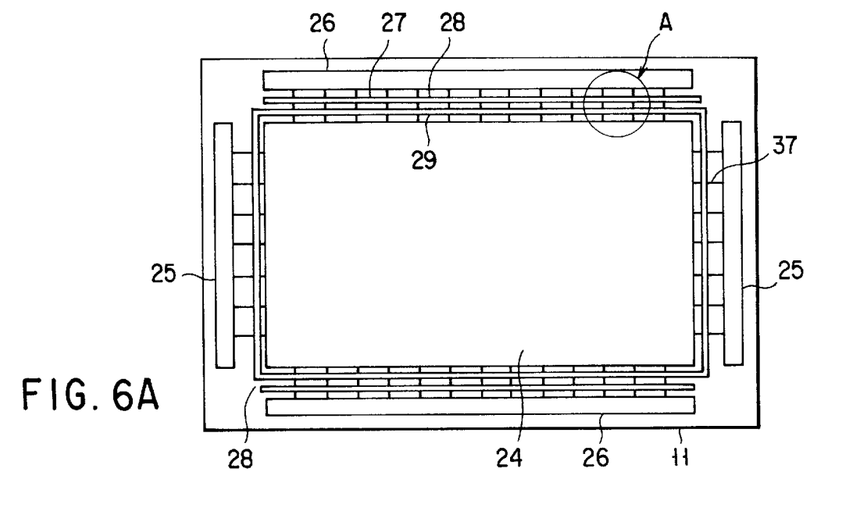
FIG. 6A is a top view of an array substrate at the termination of the process of forming pixel electrodes in a fourth example of a liquid crystal display panel of the present invention.
Figure 6B:
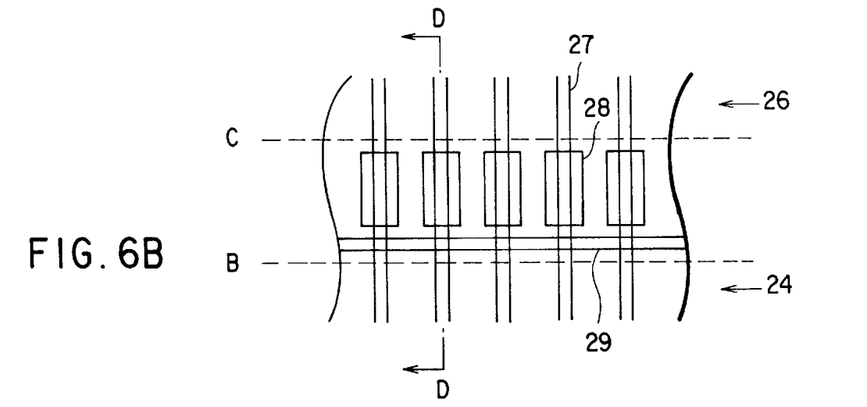
FIG. 6B is an enlarged sectional view of a portion indicated at A in FIG. 6A.
Figure 6C:
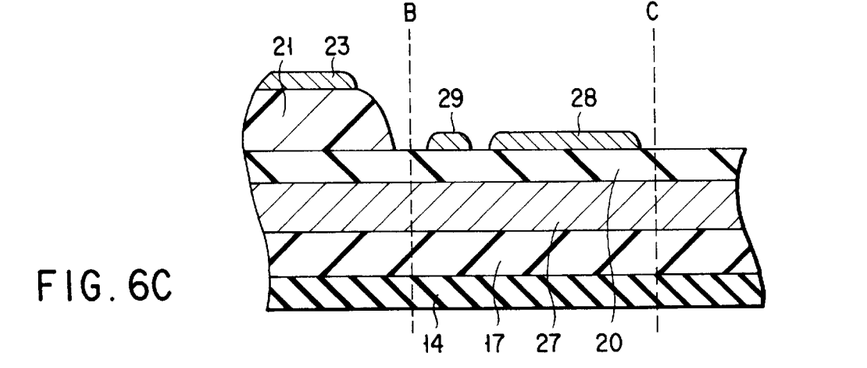
FIG. 6C is a sectional view taken along line D—D of FIG. 6B.

A further embodiment of the present invention is illustrated in FIGS. 6A, 6B and 6C. FIG. 6A is a schematic representation of the array substrate viewed from above after termination of the process of forming the pixel electrodes 23. FIG. 6B is an enlarged view of a portion indicated at A in FIG. 6A. FIG. 6C is a cross-sectional view taken along line D—D of FIG. 6B.

In this example, the ITO film 28 is formed into electrically isolated segments each of which is located above a respective one of the signal line leading portions 27 as in example 2. Additionally, the ITO film 29 is formed over the boundary areas between the display area 24 and the X-direction driver circuit areas 25 and between the display area and the Y-direction driver circuit areas 26, i.e., to continuously surround the periphery of the display area as in example 3. The ITO film 28 and the ITO film 29 are electrically isolated from each other.

In this example, the ITO film 28 performs a function of protecting the signal line leading portions 27, whereas the ITO film 29 serves as a guard ring which prevents the inside of the array substrate from being charged with static electricity. In this case, the ITO film 29 should preferably be relatively narrow in line width as compared with the ITO film 28 so as to minimize the danger of the ITO film 29 being shorted to the signal line leading portions 27.

In the above examples, the layer 21 underlying the ITO film forming the pixel electrodes is made of an insulating film of an organic material. The same advantage as in the above examples will also be obtained when a colored resist is used for that underlying layer. Thus, the present invention can also be applied to a structure in which an ITO film is formed over a colored resist.

EXAMPLE 5

Figure 7:
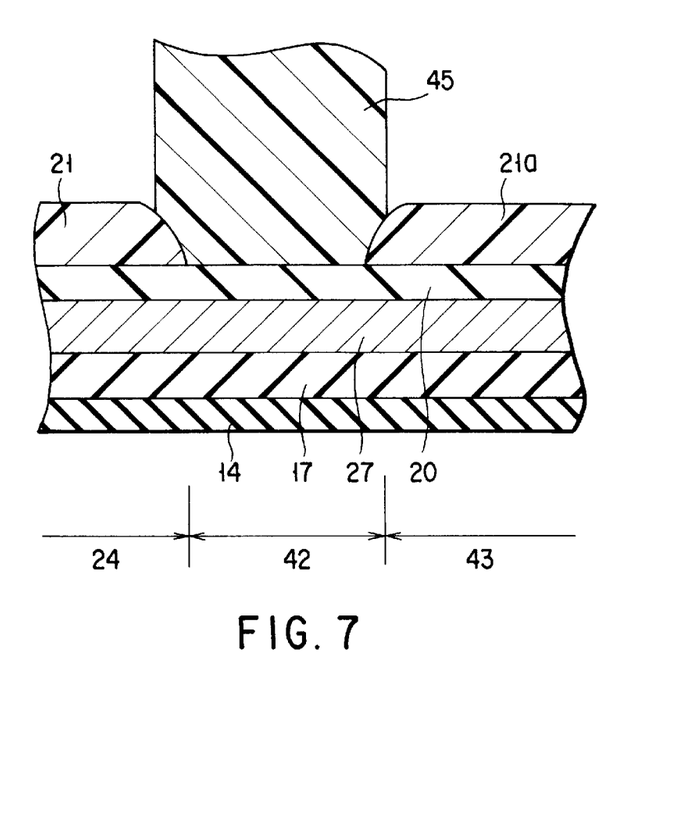
FIG. 7 is a fragmentary section view of a boundary area between display and driver circuit area on an array substrate in a fifth example of a liquid crystal display panel of the present invention.

Still another embodiment of the present invention is illustrated in FIG. 7, which is an enlarged cross-sectional view illustrating a state where a sealant 45 is placed in the seal area (the boundary area) 42. In this example, no ITO film is formed in the seal area 42.

In this example, an organic insulating film 21a is formed over a peripheral area 43 in which driver circuits are placed as well as the display area 24. The sealant 45 is placed to come into contact with the end surface of the organic insulating film 21 over the display area 24 and the end surface of the organic insulating film 21a over the peripheral area. In gluing a counter substrate to top of the array substrate so that they face each other, such a structure permits the sealant to be locked by the organic insulating films 21 and 21a, thus stabilizing the sealant position.

As shown in FIG. 7, the end surface of each organic insulating film is formed so as to make an obtuse angle with respect to the surface of the array substrate, facilitating contact between the end surface of each organic insulating film and the sealant.

Even if the sealant is brought into contact with the end surface of either the organic insulating film 21 or the organic insulating film 21a, the same advantage will result.

According to the liquid crystal display panel of the present invention, as described above, by forming a thin film of ITO (or another inorganic material) over the seal area, it becomes possible to prevent the corrosion of signal line leading portions due to defects in the underlying inorganic insulating film when pixel electrodes are patterned.

Moreover, by forming the ITO thin film continuously so as to surround the periphery of the display area, the inside of a liquid crystal display panel becomes unaffected by static electricity which may be generated during the liquid crystal display panel manufacturing process because the static electricity transmits through the ITO film.

Furthermore, by bringing a sealant into contact with the end surface of at least one of an organic insulating film formed over the display area and an organic insulating film formed over the peripheral area, the stabilization of the sealant position can be achieved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A liquid crystal display panel comprising:
   a substrate on which wirings and switching elements are arranged;
   an inorganic insulating film formed over the substrate;
   an organic insulating film formed over the inorganic insulating film;
   pixel electrodes arranged in a matrix form on the organic insulating film and supplied with signal voltages via the switching elements;
   a counter substrate placed to face the substrate with a gap therebetween and glued to the substrate with a sealant; and
   a liquid crystal sealed in the gap,
   and wherein
   the substrate has a display area in which the pixel electrodes are arranged, a seal area which surrounds the periphery of the display area and in which the sealant is placed, and a peripheral area around the seal area; and
   in the seal area, the organic insulating film is etched away, and an inorganic film is formed over the inorganic insulating film so that it overlies leading portions of the wirings that extend across the seal area.

2. The liquid crystal display panel according to claim 1, wherein the inorganic film is formed of the same material as the pixel electrodes.

3. The liquid crystal display panel according to claim 2, wherein the inorganic film is formed in the form of individual segments so that each segment is located over a respective one of the leading portions of the wirings.

4. The liquid crystal display panel according to claim 1, wherein the organic insulating film is formed over the peripheral area as well, and the sealant is in contact with an end surface of at least one of the organic insulating film formed over the display area and the organic insulating film formed over the peripheral area.

5. The liquid crystal display panel according to claim 4, wherein each of those end surfaces of the organic insulating film formed over the display area and the organic insulating film formed over the peripheral area which abut on the seal area is formed to make an obtuse angle with respect to the surface of the substrate.

6. The liquid crystal display panel according to claim 4, wherein the inorganic film is made of the same material as the pixel electrodes.

7. The liquid crystal display panel according to claim 6, wherein the inorganic film is formed in the form of isolated segments so that each segment is located over a respective one of the leading portions of the wirings.

8. A liquid crystal display panel comprising:
   a substrate on which wirings and switching elements are arranged;
   an inorganic insulating film formed over the substrate;
   an organic insulating film formed over the inorganic insulating film;
   pixel electrodes arranged in a matrix form on the organic insulating film and supplied with signal voltages via the switching elements;
   a counter substrate placed to face the substrate with a gap therebetween and glued to the substrate with a sealant; and
   a liquid crystal sealed in the gap,
   and wherein
   the substrate has a display area in which the pixel electrodes are arranged, a seal area which surrounds the periphery of the display area and in which the sealant is placed, and a peripheral area around the seal area; and
   the organic insulating film is etched away from the seal area but left in the peripheral area, and the sealant is in contact with an end surface of at least one of the organic insulating film formed over the display area and the organic insulating film formed over the peripheral area.

9. The liquid crystal display panel according to claim 8, wherein each of those end surfaces of the organic insulating film formed over the display area and the organic insulating film formed over the peripheral area which abut against the seal area is formed to make an obtuse angle with respect to the surface of the substrate.

10. A method of manufacturing a liquid crystal display panel comprising the steps of:
    forming wirings lines and switching elements over an insulating substrate;
    depositing an inorganic insulating film over the wirings and the switching elements;
    depositing an organic insulating film over the inorganic insulating film;
    etching away the organic insulating film in a seal area in which a sealant is placed later to expose the inorganic insulating film;
    depositing a conductive thin film over the organic insulating film and the exposed inorganic insulating film;
    patterning the conductive thin film to form pixel electrodes on the inorganic insulating film; and
    forming, at the same time the conductive thin film is patterned, a thin film consisting of the conductive thin film in the seal area so that it overlies leading portions of the wirings.

* * * * *